Figure 1:
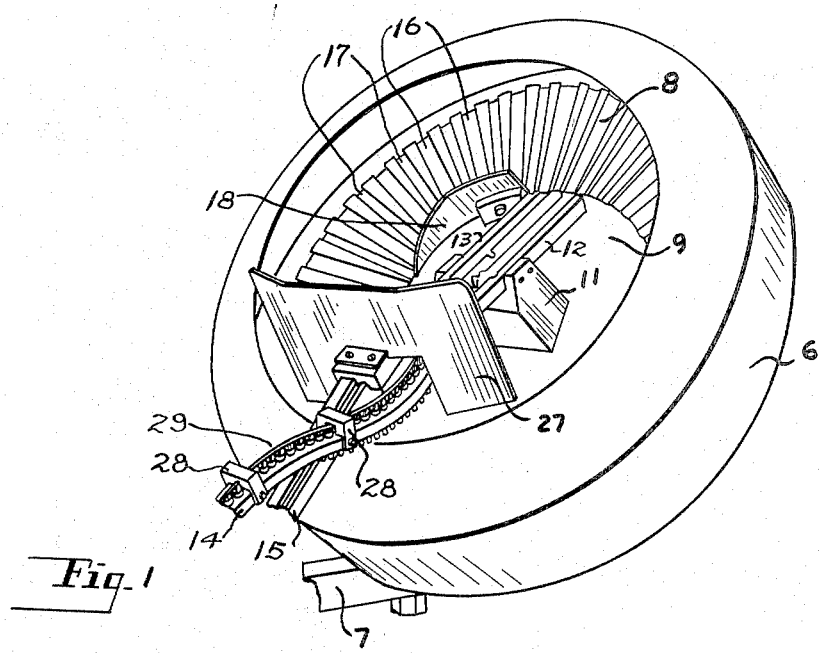

Jan. 18, 1955

R. W. BAILEY ET AL 2,699,868

DUAL HOPPER

Filed Jan. 21, 1953

2 Sheets-Sheet 1

INVENTORS.
ROY W. BAILEY.
JOHN THOMAS FAULL.
EVERETT GILL.

BY

*Samuel Weisman*

ATTORNEY.

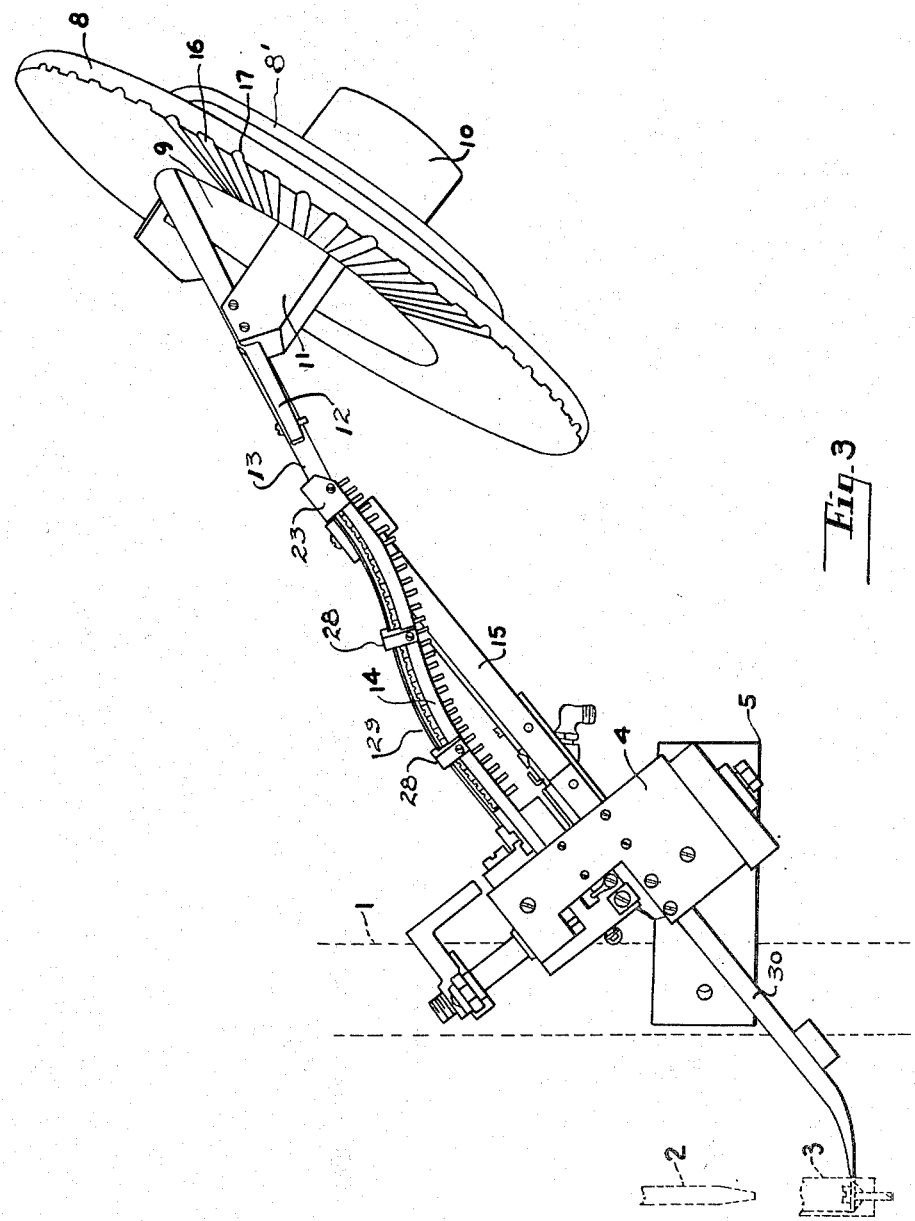

United States Patent Office 2,699,868
Patented Jan. 18, 1955

2,699,868

DUAL HOPPER

Roy W. Bailey, John T. Faull, and Everett Gill, Detroit, Mich., assignors to Detroit Power Screwdriver Company, Detroit, Mich., a corporation of Michigan Application January 21, 1953, Serial No. 332,362

9 Claims. (Cl. 209—72)

The present invention pertains to a dual hopper in which a mass of pieces of at least two different shapes is loaded and selectively picked up by a rotating ring which delivers the pieces respectively to a pair of track sections. The track sections deliver the pieces to a body in which a piece of one shape is assembled with a piece of another shape, as for example, a screw and washer, by the mechanism disclosed in our co-pending application, Serial No. 332,363, filed January 21, 1953. In the same example, the assembled screw and washer are finally delivered to a driver which inserts the screw in a work piece.

A hopper assembly for delivering pieces of one shape only is disclosed in the U. S. patents to Dellaree, No. 2,025,273 of December 24, 1935, and No. 2,060,182 of November 10, 1936. Where two parts are to be assembled together before being attached to the work piece, it has been the practice to mount two such hopper assemblies on the driving machine, one hopper for each part, with a delivery track extending from each hopper. The hoppers are of substantial size and occupy positions adjacent to the driving tool, usually at opposite sides of the tool. In many cases the work piece is of such size or shape that it cannot be accommodated at the driving tool with the two hoppers positioned adjacent thereto. In such cases this expedient cannot be used, and the pre-assembly of the pieces must be made manually or mechanically at a different location rather than mechanically or automatically at the driving machine.

The principal object of this invention is to provide a hopper assembly that enables the pre-assembly of pieces notwithstanding the limiting conditions described above. In addition, the two hoppers previously used are here replaced by a single hopper, with corresponding economy of mechanical parts.

In the accomplishment of these objects, as in the aforementioned patents, the hopper assembly includes a rotating inclined, radially slotted ring adapted to elevate pieces from a mass and deliver them to a track. The ring differs, however, in that its slots are two different shapes arranged in alternating relation for selectively picking up the two different kinds of pieces in the mass. Similarly, two track sections of different shapes extend from the ring at an area thereof where they are discharged by gravity. These sections are shaped for selective reception of the different pieces normally carried by the two series of slots and are connected to a mechanism which assembles one piece to another as disclosed in the co-pending application.

A further object of the invention is to provide means for rejecting pieces which by chance are loaded on the non-corresponding track sections. For this purpose, additional track sections are alined respectively with the first sections, spaced therefrom to form gaps which can be jumped by the proper pieces. The jump itself is sufficient to reject the majority of improper pieces, and the operation of selection is completed by fingers on the additional sections at the gaps, so arranged that they will be cleared by proper pieces and struck by improper pieces whereby the latter will be thrown off their course and will drop in the hopper.

Figure 2:
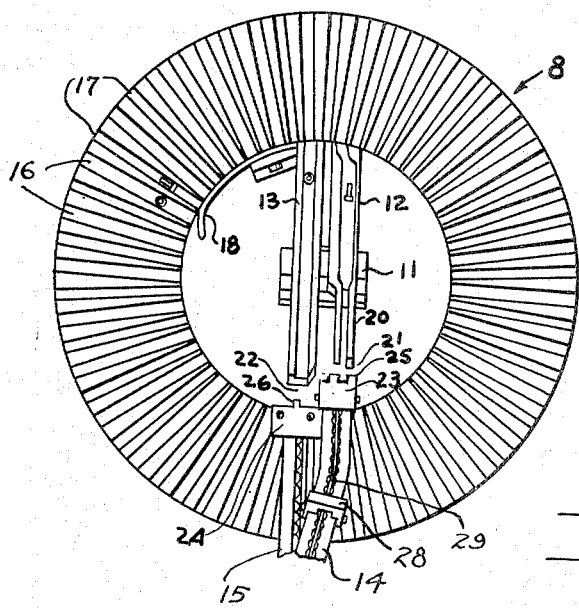

The invention is fully disclosed by way of example in the following description and in the accompanying drawings in which Figure 1 is a perspective view of the device;
Figure 2 is a plan view, and
Figure 3 is a side elevation of the complete assembly.

Reference to these views will now be made by use of like characters which are employed to designate corresponding parts throughout.

In Figure 3 is shown the post or standard 1 of a screw driving machine as disclosed in the aforementioned patents and in our co-pending application, Serial No. 332,363, filed January 21, 1953. The machine embodies the screw driver 2 adapted to engage with a resilient screw retaining device 3 as also disclosed in the prior patents.

Adjacent to the post 1 is a block or body 4 held on the post by brackets 5. The body 4 carries mechanism for assembling screws and washers as described in the co-pending application, and the assemblies are delivered to the supporting device 3.

At some distance beyond the body 4, a fixed hopper or shell 6 is supported from the post 1 by a bracket or arm 7. In the hopper 6 is rotatably mounted a radially grooved ring 8 having however a hub 8' (Figure 3) driven by a suitable motor or gearing indicated by the numeral 10.

On the bottom 9 of the hopper, within the ring 8, is mounted a block 11 for a pair of track sections. These sections are indicated by the numerals 12 and 13 and extend toward the body 4 from the inner circumference of the ring or slotted portion 8 at the point thereof more remote from the body 4. These track sections terminate substantially within the ring 8 as shown in Figure 2, for a purpose that will presently be described.

Track sections 14 and 15, alined with the sections 12 and 13 respectively but spaced somewhat therefrom, extend into the body 4. The section 14 is bent somewhat to enter the body 4 somewhat above the section 15, so that screws carried by the section 14 may be inserted in washers delivered by the section 15, as set forth in the co-pending application.

The ring 8 is formed with radial slots or grooves 16 which are flat bottomed and of a depth and width to receive washers lying flat therein. Grooves or slots 17 of a different shape alternate with the slots 16 and are deeper, narrower and rounded to receive screws lying lengthwise therein. The cross sectional shape of the grooves 17 corresponds to the head of the screw being handled. The ring 8 on being rotated picks up screws and washers from a mass lying in the lowermost portion of the inclined hopper 6, and the pieces are carried by the ring 8 as shown in Figure 2. The washers are too wide to enter the slots 17, but screws may enter the slots 16. Such screws are ultimately thrown back into the hopper as will be described. A baffle 18 secured to the fixed structure at the upper end of the track sections 12 and 13 extends in the counter-rotational direction along the lower ends of a number of adjacent slots, for the purpose of preventing pieces from dropping out of the slots into the hopper before reaching the upper ends of the track sections 12 and 13.

The lower end of the track section 12 is forked at 20, providing an open bottom so that a screw reaching this end will hang by its head. The section 13, on the other hand, is a channel throughout its entire length so that the washer will lie flat therein.

The lower track section 14 alined with the section 12 is also open bottomed so that the screws will likewise be suspended therein after jumping the gap 21 between these sections. If a washer should by chance slide down upon the section 12, it will strike the end of the section 14 and fall back into the hopper.

The section 15 has a solid bottom throughout its length to carry washers that jump the gap 22 between the sections 13 and 15. A screw sliding down the section 13 will strike the end of the section 15 and fall back into the hopper.

Guards 23 and 24 are placed over the upper ends of the track sections 14 and 15 respectively to aid in rejecting undesired pieces. For this purpose the guard 23 has a pair of spaced fingers 25 adapted to admit a screw shank but too closely spaced to admit a washer. Similarly, the guard 24 has a central finger 26 permitting a washer to pass beneath it but in the path of a screw sliding down the section 13. A baffle 27 is mounted on the hopper bottom 9 somewhat forward of the gaps 21 and 22 so that pieces rejected at the gaps will not be thrown out of the hopper. Additional guards 28 and a hold-down wire 29 may be mounted over the track section 14 to hold the screws suspended.

Screws and washers are admitted individually into the body 4 by an escapement mechanism disclosed in the co-pending application. The assembled screws and washers are delivered from the body 4 by a track 30 extending to the holder 3 in Figure 3, from which the screws are driven into a work piece.

Although a specific embodiment of the invention has been illustrated and described, it will be understood that various alterations in the details of construction will be made without departing from the scope of the invention as indicated by the appended claims.

What we claim is:

1. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots said sections being shaped differently from each other and adapted for selective reception of pieces from the respective series of slots.

2. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots one of said sections being of channel form with an open bottom at its lower end to receive screws from one of said series of slots and suspend them by their heads, and the other section being of channel shape with a closed bottom to receive in flatwise position washers delivered thereto by the other series of slots.

3. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots said sections being shaped differently from each other and adapted for selective reception of pieces from the respective series of slots, additional track sections alined respectively with the first sections and spaced therefrom to form gaps to be jumped by the pieces sliding down the first sections, and means on the second sections at said gaps for rejecting pieces not conforming to the respectively alined first sections.

4. In a hopper, a shell, a ring rotatably mounted therein and inclined between vertical and horizontal planes to pass though a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots said sections being shaped differently from each other and adapted for selective reception of pieces from the respective series of slots, additional track sections alined respectively with the first sections and spaced therefrom to form gaps to be jumped by the pieces sliding down the first sections, said additional sections being shaped similarly to the open-bottom and closed-bottom sections with which they are respectively alined.

5. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots said sections being shaped differently from each other and adapted for selective reception of pieces from the respective series of slots, additional track sections alined respectively with the first sections and spaced therefrom to form gaps to be jumped by the pieces sliding down the first sections, said additional sections being shaped similarly to the open-bottom and closed-bottom sections with which they are respectively alined, and means on the second sections at said gaps for rejecting pieces not conforming to the respectively alined first sections.

6. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots said sections being shaped differently from each other and adapted for seiective reception of pieces from the respective series of slots, additional track sections alined respectively with the first sections and spaced therefrom to form gaps to be jumped by the pieces sliding down the first sections, a central finger above one of said additional sections at the adjacent gap and positioned to reject pieces exceeding a predetermined height, and a pair of laterally spaced fingers at the other additional section at the adjacent gap and adapted to reject pieces exceeding a predetermined width.

7. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots one of said sections being of channel form with an open bottom at its lower end to receive screws from one of said series of slots and suspend them by their heads, and the other section being of channel shape with a closed bottom to receive in flatwise position washers delivered thereto by the other series of slots, additional sections alined respectively with the first sections and spaced therefrom to form gaps to be jumped by the pieces sliding down the first sections, and means on the second sections at said gaps for rejecting pieces not conforming to the respectively alined first sections, the means at the open-bottom end being adapted to reject pieces not suspended, and the means at the closed-bottom section being adapted to reject pieces exceeding a pre-determined height.

8. In a hopper, a shell, a ring rotatably mounted therein and inclined between vertical and horizontal planes to pass through a mass of pieces in the lowermost portion of said shell, said ring having on its upper surface a series of like radial slots adapted to receive pieces of a given shape and having on the same surface another series of like slots alternating with the first named slots and shaped differently therefrom to receive pieces of another shape, a pair of track sections extending downwardly from a high point of the inner circumference of said ring, a baffle at the inner circumference of said ring and extending from said track in the counter-rotational direction across the inner ends of a plurality of slots one of said sections being of channel form with an open bottom at its lower end to receive screws from one of said series of slots and suspend them by their heads, and the other section being of channel shape with a closed bottom to receive in flatwise position washers delivered thereto by the other series of slots, additional track sections alined respectively with the first sections and spaced therefrom to form gaps to be jumped by the pieces sliding down the first sections, a central finger above one of said additional sections at the gap adjacent to the closed-bottomed end and positioned to reject pieces not suspended in said end, and a pair of laterally spaced fingers on the other additional section at the adjacent gap and positioned to reject pieces exceeding a pre-determined height.

9. In a hopper, a shell, a ring rotatably mounted therein and adapted to pass through a mass of pieces in said shell, said ring having on its upper surface a series of like radial slots adapted to receive pieces of a given shape and having on the same surface another series of like slots alternating with the first named slots and shaped differently therefrom to receive pieces of another shape.

References Cited in the file of this patent

UNITED STATES PATENTS

| | | |
|---|---|---|
| 1,739,422 | Schmidt | Dec. 10, 1929 |
| 2,350,486 | Bailey | June 6, 1944 |